Oct. 23, 1962     H. HERBERT ET AL     3,059,318
METHOD OF MAKING A BEARING INSERT FOR BALL JOINTS
Filed Sept. 8, 1959
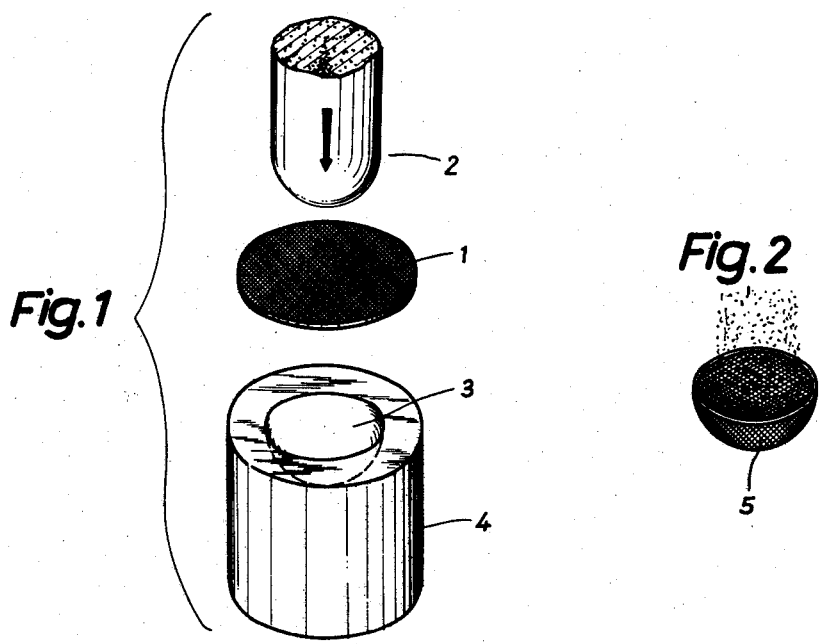
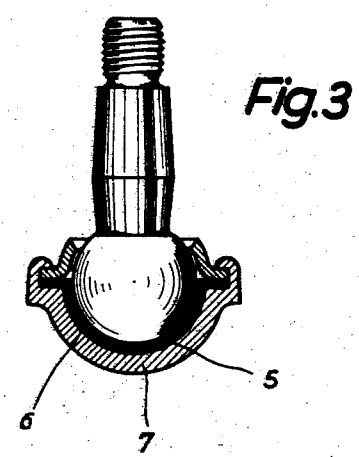

3,059,318
METHOD OF MAKING A BEARING INSERT FOR BALL JOINTS
Hans Herbert, Dusseldorf, Manfred Reiher, Hofheim (Taunus), and Gerhard Pfleiderer, Kriftel (Taunus), Germany, assignors to Farbwerke Hoechst Aktiengesellschaft vormals Meister Lucius & Brüning, Frankfurt am Main, Germany, and A. Ehrenreich & Cie, Dusseldorf-Oberkassel, Germany
Filed Sept. 8, 1959, Ser. No. 838,666
Claims priority, application Germany Sept. 11, 1958
4 Claims. (Cl. 29—149.5)

The present invention relates to a method of making ball joints and, more specifically, concerns a method of making a bearding cup of polytetrafluorethylene for ball joints. Polytetrafluorethylene has in a rather short time become adopted as bearing material because its friction coefficient when mating with steel is very low. Of particular importance is the fact that this friction mating practically requires no lubrication.

However, the use of polytetrafluorethylene as bearing material has the drawback that it is relatively expensive and in addition thereto is characterized by the so-called cold flow. For this reason the employment of polytetrafluorethylene in the form of customary bearing cups is hardly possible. Therefore, it would be necessary to employ polytetrafluorethylene as a thin layer only on the ball head or to deposit polytetrafluorethylene as a thin layer in the housing. This, however, encounters the difficulty that polytetrafluorethylene has no adhering or sticking properties. For this reason, it has been suggested for instance to plate steel sheet metal with a porous bronze alloy. The bronze will in such an instance serve as carrier for the synthetic material in such a way that all cavities will be permeated with polytetrafluorethylene and the surface will obtain a thin layer thereof. This complicated procedure is required because heretofore no other possibility was available properly to bind the said synthetic material to other materials.

For purposes of providing a coating of polytetrafluorethylene, it has been suggested to deposit a dispersion of polytetrafluorethylene directly upon the metal surface. Also this procedure is technically not simple and can be used in special instances only. The last mentioned method is particularly difficult to apply if not merely cylindrical bearing bushings are involved but a semi-spherical cup-shaped ball socket for use as bearing cup for ball joints.

It is, therefore, an object of the present invention to provide a method of employing polytetrafluorethylene for making ball cups, especially for ball joints, which will overcome the above mentioned drawbacks.

It is also an object of this invention to provide a method of making bearing cups for ball joints of a fluor containing polymer, as for instance polytetrafluorethylene, which can be carried out in a simple manner and will be highly effective.

These and other objects and advantages of the invention will appear more clearly from the following specification in connection with the accompanying drawing, in which:

FIG. 1 illustrates the preshaping of a fabric for use in connection with the present invention.

FIG. 2 illustrates the coating with polytetrafluorethylene powder of a fabric insert shaped in conformity with FIG. 1.

FIG. 3 represents a ball joint having a bearing cup according to the invention fixedly mounted directly in the housing.

In conformity with the present invention, a ball joint bearing cup having a bearing surface of a fluor containing polymer, as for instance polytetrafluorethylene, comprises a supporting body for the supporting surface which body comprises a fabric, for instance a glass fiber fabric. By means of this supporting body, the synthetic bearing surface can relatively easily be anchored in the housing.

More specifically, with reference to FIG. 1 of the drawing, a fabric disc 1 made for instance of glass fibers is by means of a punch 2 pushed into a substantially semi-spherical cavity 3 in a mold 4 to form a substantially semi-spherical supporting body 5 as shown in FIG. 2. In further development of this invention, the said fabric, preferably after being preshaped into the body 5, is covered with a pulverized fluor containing polymer, as for instance polytetrafluorethylene. This may be done by spraying, dusting, or the like. The thus deposited layer 6 of pulverized synthetic material of the above mentioned type is then firmly connected to the fabric by sintering. This method can easily be carried out and has the advantage that the thickness of the coating can be varied in conformity with the respective requirements. Depending on the type of the fabric to be employed, it is sometimes advantageous to shape the fabric in conformity with the ball head prior to the coating of the fabric.

According to a modified method of the present invention, the ball cup consisting of a fabric and having been preshaped in conformity with the contour of the ball head and covered with polytetrafluorethylene or another fluor containing polymer, may be placed over the ball head of the ball joint. Subsequently, the ball head stud is placed into the ball housing, and a space left between cup 5 and housing 7 is filled with a material of lower quality, as for instance an unsaturated polyester resin, a cast or pressed resin, or the like. It is this material of lower quality between the ball cup 5 and the housing 7 which will then serve as supporting body. In this way, the ball cup composed of three different components will form a unit which can be produced as an article of mass manufacture and at low cost.

The present invention makes it possible to employ a fluor containing polymer such as polytetrafluorethylene for the manufacture of ball cups or in connection with the manufacture of ball joints while taking advantage of the well known highly desirable properties of such synthetic material without encountering the drawbacks thereof.

It is, of course, to be understood that the present invention is, by no means, limited to the particular constructions and methods set forth above but also comprises any modifications within the scope of the appended claims.

Thus, the present invention is by no means limited to the employment of glass fibre fabric for the supporting body 5 but also other types of fabric may be employed, as for instance textile fabric, asbestos fabric or any fibre fabric used in the artificial material industry.

What we claim is:

1. In a method of making a bearing insert for a ball joint, which includes the steps of shaping a fabric into a shape conforming to the desired bearing surface, depositing a pulverous fluor containing polymer upon the thus shaped fabric, and sintering said polymer on said fabric to thereby firmly connect the same to said fabric.

2. A method of providing a housing of a ball joint with a bearing insert, which includes the steps of shaping a fabric into a shape conforming to the desired bearing surface, depositing a pulverous fluor containing polymer upon the thus shaped fabric, sintering said polymer on said fabric to thereby firmly connect the same to said fabric, and inserting the thus shaped bearing insert into and connecting the same to said housing.

3. A method of making a ball cup for a ball joint, which includes the steps of shaping a fabric into a shape conforming to the desired bearing surface of said ball cup, dusting a pulverous polytetrafluorethylene upon the thus shaped fabric, and sintering said deposited polytetrafluorethylene on the thus shaped fabric to thereby firmly anchor the same to said fabric.

4. In a method of making a ball joint having a housing, the steps of preshaping a fabric into a substantially ball-shaped cup in conformity with the contour of the ball head to be supported thereby, depositing a pulverous fluor containing polymer upon the thus shaped fabric, sintering said polymer on said fabric to thereby f mly connect said fluor containing polymer to said fabric, mounting the thus obtained cup in spaced relationship to and within said housing, and filling the space between said cup and said housing with a resin to support said cup.

References Cited in the file of this patent

UNITED STATES PATENTS

| | | |
|---|---|---|
| 2,448,483 | Bassett | Aug. 31, 1948 |
| 2,539,329 | Sanders | June 23, 1951 |
| 2,689,380 | Tait | Sept. 21, 1954 |
| 2,728,698 | Rudner | Dec. 27, 1955 |
| 2,768,925 | Fay | Oct. 30, 1956 |
| 2,804,886 | White | Sept. 3, 1957 |
| 2,835,521 | White | May 20, 1958 |
| 2,885,248 | White | May 5, 1959 |
| 2,887,346 | Gaugler | May 19, 1959 |
| 2,906,573 | Runton | Sept. 29, 1959 |